(12) United States Patent
Blood et al.

(10) Patent No.: US 9,457,957 B1
(45) Date of Patent: Oct. 4, 2016

(54) PIPE CARRYING DEVICE

(71) Applicants: Scott Blood, Salmon, ID (US); Kevin Drake, Comstock, NE (US)

(72) Inventors: Scott Blood, Salmon, ID (US); Kevin Drake, Comstock, NE (US)

( * ) Notice: Subject to any disclaimer, the term of this patent is extended or adjusted under 35 U.S.C. 154(b) by 57 days.

(21) Appl. No.: 14/585,709

(22) Filed: Dec. 30, 2014

(51) Int. Cl.
 B65G 7/12 (2006.01)
(52) U.S. Cl.
 CPC ........................ B65G 7/12 (2013.01)
(58) Field of Classification Search
 CPC . B65G 7/12; A45F 2005/1006; A62C 33/04; B66C 1/422; B66C 1/442
 USPC .......................... 294/16, 50.8, 118
 See application file for complete search history.

(56) References Cited

U.S. PATENT DOCUMENTS

| | | | | |
|---|---|---|---|---|
| 270,069 | A * | 1/1883 | Hudson .................... | B65G 7/12 294/16 |
| 666,474 | A * | 1/1901 | De Wolfe ................ | B65G 7/12 248/76 |
| 1,234,565 | A * | 7/1917 | Pugh ........................ | B65G 7/12 294/16 |
| 1,286,789 | A * | 12/1918 | Russell .................... | B65G 7/12 294/16 |
| 2,746,064 | A * | 5/1956 | Ausmus ................. | A62C 31/28 24/132 R |
| 2,819,111 | A * | 1/1958 | Cozzens ................... | F16L 1/06 294/106 |
| 3,056,571 | A * | 10/1962 | Schofield ............... | A62C 33/04 24/19 |
| 4,723,800 | A * | 2/1988 | Sanders .................. | B25B 5/147 294/106 |
| 4,893,393 | A | 1/1990 | Marshall | |
| 4,929,010 | A * | 5/1990 | Lahti ..................... | A01G 23/043 294/118 |
| 6,012,363 | A | 1/2000 | Minkin | |
| 6,276,732 | B1 | 8/2001 | Hauss | |
| 6,595,566 | B1 | 7/2003 | Donnan | |
| 2013/0099515 | A1 | 4/2013 | Guerrero | |

FOREIGN PATENT DOCUMENTS

WO    WO0139928    6/2001

* cited by examiner

*Primary Examiner* — Dean Kramer
(74) *Attorney, Agent, or Firm* — Goldstein Law Offices, P.C.

(57) ABSTRACT

A pipe carrying device for effectively gripping and transporting a pipe between a pair of users. The pipe includes a pair of elongated rods extending along a rod axis and a bend defined by the rod extending downwardly away from the rod axis. The rods are pivotally coupled at an outboard hinge located at the bend. The hinge includes a hinge axis round which the rods are configured to pivot. Each rod further includes at least one associated hemispheric clamp, the clamps forming a cylinder when the device is in a gripping position. The cylinder has a clamp axis extending parallel to the hinge axis and perpendicular to the rod axis. The device is biased towards the gripping position via the upward rotation of the rods, urging the clamps towards each other for securely holding and carrying the pipe within the cylinder when oriented therein.

10 Claims, 3 Drawing Sheets

US 9,457,957 B1

PIPE CARRYING DEVICE

TECHNICAL FIELD

The present disclosure relates generally to a pipe carrying device. More particularly, the present disclosure relates to a pipe carrying device for gripping and carrying weighty objects, especially cylindrical objects, such as piping.

BACKGROUND

User safety is a chief concern in any industry where over-sized and weighty materials and components, such as piping, are engaged. One such industry, is the construction industry where weighty pipes and bulky objects are frequently used on work sites. Workers must often carry and transport this equipment between warehouses and locations within the work site. As a result, these workers often suffer injury when lifting and manipulating the piping to effectively and safely transport it. Often, they are unable to lift the piping altogether. Additionally, the shape of such equipment, especially industrial piping, does not enable the workers to grip the piping securely, even when multiple workers are available to assist in the transport. As a result, the heavy piping can roll and plummet to the floor and onto the worker's limbs and feet, causing further injury. Further, the workers must typically grip the weighty piping with both hands, prohibiting them from breaking their fall should they fall while carrying the piping.

Yet further, a worker must often exert an enormous amount of brute force to lift and and carry the piping. As a result, the worker is often unaware or unable to carry such piping without placing his fingers at a pinch point wherein they can be severely injured, such as between the piping or between the pipe and a floor.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a complete solution for safely and efficiently transporting a pipe between a pair of users. Accordingly, the present disclosure provides an example embodiment of the pipe carrying device including a pair of directly opposing elongated rods each having an associated clamp, the rods configured to be carried between a pair of users and extending along a rod axis. The rods include an outboard hinge for pivotally coupling the rods to one another.

Another aspect of an example embodiment in the present disclosure is to provide the pipe carrying device which transitions easily between a gripping position and a releasing position. Accordingly, the present disclosure provides an example embodiment of the pipe carrying device including the outboard hinge having a hinge axis around which the rods are configured to rotate when transitioning the device between a gripping position when the rods are lifted upwardly, and a releasing position.

A further aspect of an example embodiment in the present disclosure is to provide the pipe carrying device which securely grips a pipe between the users without interfering with the users' gait. Accordingly, the present disclosure provides an example embodiment of the pipe carrying device including a pair of hemispheric clamps configured for touching to form a cylinder when the device is biased towards the gripping position for securely holding a pipe therein. The cylinder has a clamp axis which extends parallel to the hinge axis and perpendicular to the rod axis.

Accordingly, disclosed is a pipe carrying device for effectively gripping and transporting a pipe between a pair of users. The pipe includes a pair of elongated rods extending along a rod axis and a bend defined by the rod extending downwardly away from the rod axis. The rods are pivotally coupled at an outboard hinge located at the bend. The hinge includes a hinge axis round which the rods are configured to pivot. Each rod further includes at least one associated hemispheric clamp, the clamps forming a cylinder when the device is in a gripping position. The cylinder has a clamp axis extending parallel to the hinge axis and perpendicular to the rod axis. The device is biased towards the gripping position via the upward rotation of the rods, urging the clamps towards each other for securely holding and carrying the pipe within the cylinder when oriented therein.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
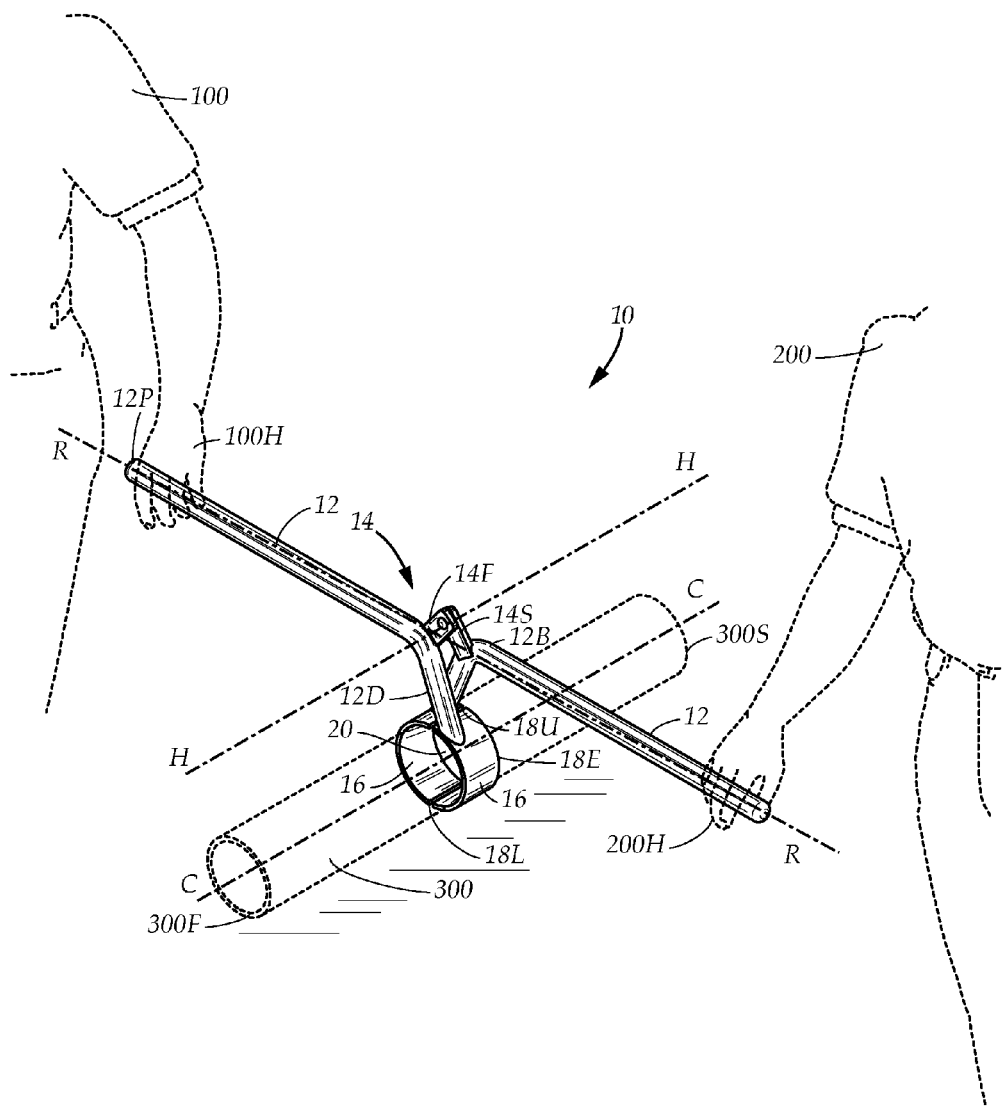
FIG. 1 is a diagrammatic perspective view of an example embodiment of a pipe carrying device in a gripping position and being engaged by a pair of users, according the present disclosure.

FIG. 1 illustrates a pipe carrying device 10 for safely and efficiently transporting pipes, of variable weight, between locations. The device 10 provides a complete solution for securely gripping and carrying a pipe 300 such that it can be carried between a pair of users 100,200 when the device 10 is in a gripping position, without interfering with the users' gait, and the weight of the pipe 300 is distributed therebetween. However, it is understood that the device 10 can also be operably used by a single user.

Figure 3:
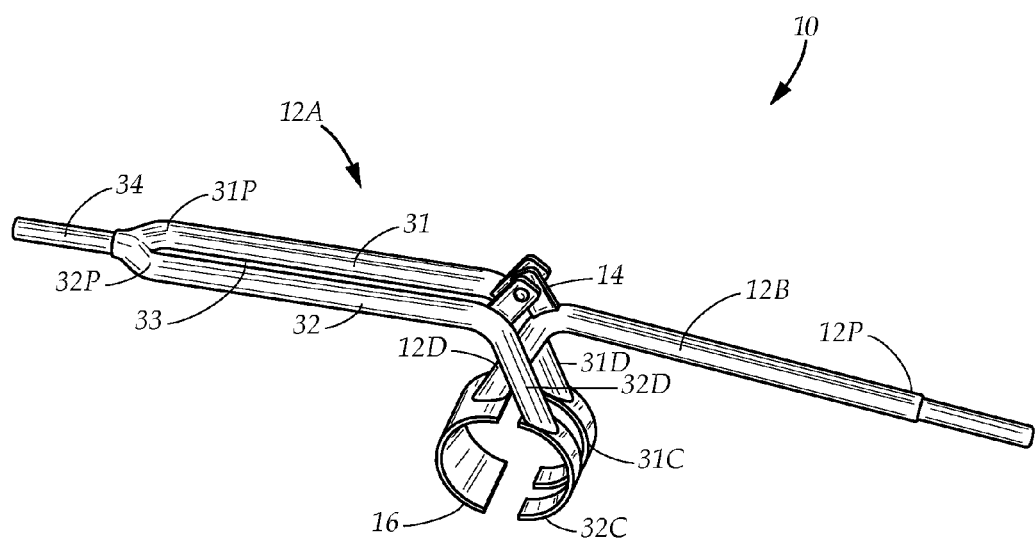
FIG. 3 is a diagrammatic perspective view of another example embodiment of the pipe carrying device having a plurality of elongated rods, each rod having an associated clamp, according to the present disclosure.

The pipe carrying device 10 includes a pair of elongated opposing rods 12, and an outboard hinge 14 for pivotally coupling the rods 12 to one another. The rods 12 each have a proximal end 12P, a distal end 12D, and a length extending between the proximal end 12P and the distal end 12D. The proximal end 12P of each rod 12 can further include a handle 34 and/or a grip for gripping the rods 12 more securely and comfortably, as illustrated in FIG. 3. The rods 12 further have a rod axis R along which the length of the rod 12 extends when the device 10 is in the gripping position, as illustrated in FIG. 1. The rod 12 is of a sufficient length to enable the distribution of a pipe's 300 weight between the users 100,200 when carrying the pipe 300 between them. Further, the rods 12 can be of a length sufficient to enable the users 100,200 to operably engage and carry the device 10 with a single hand 100H,200H, or both of the users' hands. Each rod 12 further includes a bend 12B near the distal ends defined by the rods 12 extending downwardly away from the rod axis when the device 10 is being operably used.

FIG. 1 further illustrates the outboard hinge 14 oriented at the bend 12B of each rod 12. The hinge 14 includes a first arm 14F and a second arm 14S. The hinge 14 has a hinge axis H around which the rods 12 are configured for pivoting between the gripping position and the releasing position, further described hereinbelow. Further, while illustrated as an outboard hinge 14, it is understood that alternative hinges and pivoting mechanisms may be used while maintaining the functionality of the device 10.

Yet further, FIG. 1 illustrates each rod 12 including an associated hemispheric clamp 16 operably coupled to the distal end 12D. Each clamp 16 has a pair of longitudinal edges, an upper longitudinal edge 18U coupled to the associated rod 12 and a lower longitudinal edge 18L, and a pair of lateral edges 18E extending between the longitudinal edges 18U,18L. Each rod 12 and its associated clamp 16 can be of uniform construction and/or can be separate parts. The longitudinal edges 18U,18L of the clamps 16 are configured for touching to form a cylinder 20 within which the pipe 300 can be oriented when the device 10 is in the gripping position. However, it is understood that the lateral edges 18E can be generally concave to form variable shapes when the longitudinal edges 18U,18L are urged towards each other, including, but not limited to a triangle, a sphere, a square, and a rectangle. Further, the cylinder 20 has a clamp axis C extending parallel to the hinge axis H and perpendicular to the rod axis R. The device 10 is configured for carrying a pipe 300 having a first end 300F, a second end 300S, and a length extending between the first end 300F and the second end 300S. Accordingly, when operably engaging the pipe 300, the clamps 16 grip the pipe 300 along the length such that the length extends along the clamp axis C.

Referring now to FIG. 3, another example embodiment of the pipe carrying device 10 having a plurality of rods 12, is illustrated. At least one of the rods 12A and its associated clamp and outboard hinge are bifurcated to form a first subset 31 having a proximal end 31P and a distal end 31D having a first subset clamp 31C, and a second subset 32 having a proximal end 32P and a distal end 32D having a second subset clamp 32C. The subsets 31,32 extend parallel to one another and define a channel 33 within which the opposing rod 12B and its associated hinge arm 14 is configured to rotate, as described hereinabove, between the gripping and releasing positions. In an example embodiment, the proximal ends 31P,32P of the subsets converge towards a unitary handle portion 34, as illustrated in FIG. 3. Alternatively, the proximal ends can remain separate and can each include a pair of handle portions which can be alternately engaged by a user. In a further example embodiment (not illustrated), the device can include a plurality of subsets having associated hinges and clamps, which are pivotally coupled at the hinges. When thus configured, the subsets can grip a pipe having a variable width extending along the pipe's length. Additionally, the users can manipulate the subsets such that they transition between the gripping and the releasing positions independently of one another and/or uniformly.

Further, the first subset clamp 31C and the second subset clamp 32C each have width. In an example embodiment, the combined widths of the first subset clamp 31 and the second subset clamp 32C are substantially equal to the width of the opposing clamp 16. Alternatively, the combined width of the first subset clamp 31C and the second subset clamp 32C can be greater and/or smaller than the width of the opposing clamp 16.

Figure 2A:
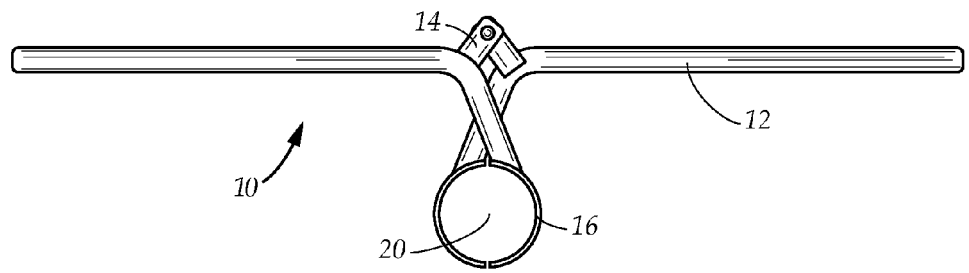
FIG. 2A is a side elevational view of an example embodiment of the pip carrying device in the gripping position, according to the present disclosure.
Figure 2B:
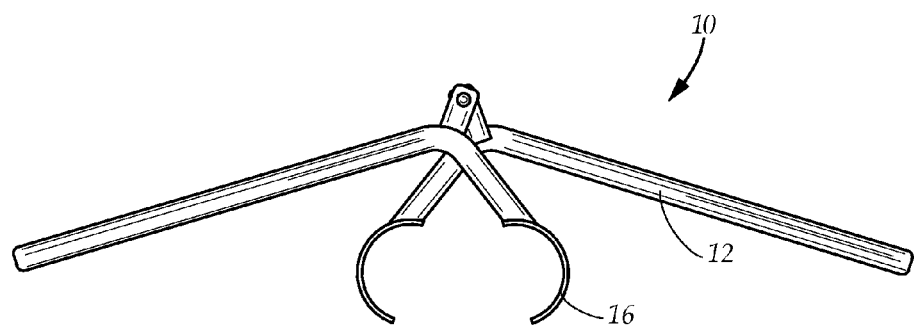
FIG. 2B, similar to FIG. 2A, is a side elevational view of an example embodiment of the pipe carrying device in a releasing position, according to the present disclosure.

Referring now to FIGS. 2A and 2B, a method for transitioning the device 10 between the gripping position and the releasing position, is illustrated. When a pipe is oriented between the clamps 16, the device 10 is biased towards the gripping position via the upward manipulation of the rods 12 around the hinge axis. As illustrated in FIG. 2A, the outboard hinge 14 directs the movement of the hemispheric clamps 16, and urges the clamps 16 towards each other to form the cylinder 20 which securely holds the pipe therein. Inversely, FIG. 2B illustrates the device 10 biased towards the releasing position via the downward manipulation of the rods 12 around the hinge axis. The outboard hinge 14 directs the movement of the hemispheric clamps 16 away from each other, breaking the cylinder, and releasing the pipe retained therein.

The pipe carrying device 10, and the rods 12 and associated clamp 16 components therein, can be comprised of individual pieces operably coupled together for operative use of the device 10. Alternatively, each rod and its associated clamp can be of unitary construction. Additionally, while described within the context of carrying pipes and similar cylindrical objects, it is understood that the device 10 can be operably used for securely retaining and carrying substantially weighty objects of variable shapes and sizes. Further, it is understood, that the device 10 can be operably used generally for gripping, carrying, and transporting said array of pipes and objects in similar industrial and commercial settings, and/or on a smaller scale within domestic settings.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pipe carrying device. The disclosure is illustrated by example in the drawing figures, and throughout the written description. It should be understood that numerous variations are possible, while adhering to the inventive concept. Such variations are contemplated as being a part of the present disclosure.

What is claimed is:

1. A pipe carrying device having a gripping position and a releasing position, the device for gripping and carrying a cylinderical pipe, the pipe having a first end, a second end, and a length extending between the first end and the second end, comprising:
   a pair of elongated opposing rods, each rod having a proximal end and a distal end, the rods having a rod axis along which the rods extend when the device is oriented in the gripping position, each rod also including a bend near the distal end, the bend defined by the rod extending downwardly away from the rod axis;
   an outboard hinge located at the bend, the hinge including a first arm and a second arm that are pivotally connected at a hinge point having a hinge axis, the first arm and the second arm each secured to one of the rods at its bend, such that the rods pivot around the hinge axis; and
   a pair of hemispheric clamps, each clamp having a pair of longitudinal edges, an upper longitudinal edge operably coupled to the distal end of each rod, a lower longitudinal edge, and a pair of lateral edges extending between the longitudinal edges, the clamps configured for touching along the upper and the lower longitudinal edges forming a cylinder when the device is in the gripping position, the cylinder having a clamp axis, the clamp axis extending parallel to the hinge axis and perpendicular to the rod axis, the outboard hinge directing movement of the hemispheric clamps between the releasing position and the gripping position such that when the rods are pulled upwardly, the device is biased towards the gripping position wherein the hemispheric clamps are urged toward each other, the device thereby adapted for securely holding the pipe therein.

2. The pipe carrying device as recited in claim 1, wherein each rod and its associated clamp are unitary in construction.

3. The pipe carrying device as recited in claim 1, wherein each rod includes a handle portion for gripping the rods more securely.

4. The pipe carrying device as recited in claim 1, wherein at least one of the rods and its associated clamp and outboard hinge are bifurcated to form a first subset and a second subset, each subset having a proximal end and a distal end, the subsets extending parallel to the other and defining a channel, the other opposing rod and its hinge arm extending through and pivoting within the channel around the hinge axis, between the gripping and the releasing positions.

5. The pipe carrying device as recited in claim 4, wherein each of the clamps has a width, the clamps of the first subset and the second subset having a combined width which is substantially equal to the width of the opposing clamp.

6. The pipe carrying device as recited in claim 5, wherein the device has a pair of handle portions, a first handle portion towards which the proximal ends of the first and second subsets converge, and a second handle portion at the proximal end of the opposing rod.

7. A carrying device for gripping and transporting a substantially weighty object within an industrial setting, the object having a first end, a second end, and a length extending between the first end and the second end, comprising:
   a pair of elongated opposing rods, each rod having a proximal end and a distal end, each rod has a handle portion at the proximal end, the rods having a rod axis along which the rods extend when the device is oriented in a gripping position, each rod also including a bend portion near the distal end, the bend defined by the rod extending downwardly away from the rod axis;
   an outboard hinge located at the bend, including a first arm and a second arm that are pivotally connected at a hinge point having a hinge axis, the first arm and the second arm each secured to one of the rods at its bend, such that the rods pivot around the hinge axis;
   a pair of clamps, each clamp having a pair of longitudinal edges, an upper longitudinal edge operably coupled to the distal end of each rod, a lower longitudinal edge, and a pair of concave lateral edges extending between the longitudinal edges, the clamps forming an enclosed gripping area when the device is in the gripping position, the gripping area having a clamp axis extending parallel to the hinge axis and perpendicular to the rod axis, the outboard hinge directing the movement of the clamps between a releasing position and the gripping position such that when the rods are pulled upwardly, the device is biased towards the gripping position wherein the clamps are urged toward each other, the device thereby adapted for securely holding the weighty object therein; and wherein at least one of the rods and its associated clamp and outboard hinge are bifurcated to form a first subset and a second subset, each subset having a proximal end and a distal end, the subsets extending parallel to the other and defining a channel, the other opposing rod and its hinge arm extending through and pivoting within the channel around the hinge axis, between the gripping and the releasing positions.

8. The carrying device as recited in claim 7, wherein the gripping area is circular in shape.

9. The carrying device as recited in claim 8, wherein each of the clamps has a width, the clamps of the first subset and the second subset having a combined width which is substantially equal to the width of the opposing clamp.

10. The carrying device as recited in claim 9, wherein the device has a pair of handle portions, a first handle portion towards which the proximal ends of the first and second subsets converge, and a second handle portion at the proximal end of the opposing rod.

\* \* \* \* \*